Sept. 13, 1949. T. W. WINSTEAD 2,481,554
THERMOPLASTIC FILM HEAT SEALING ELEMENT
Filed Dec. 17, 1946
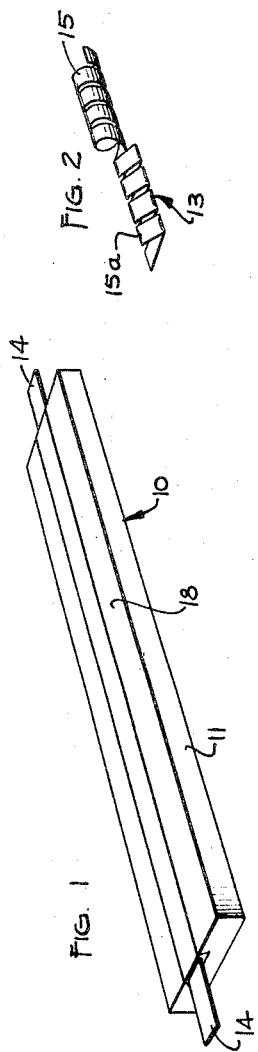
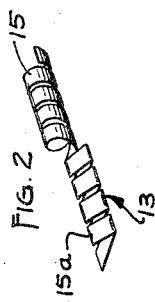
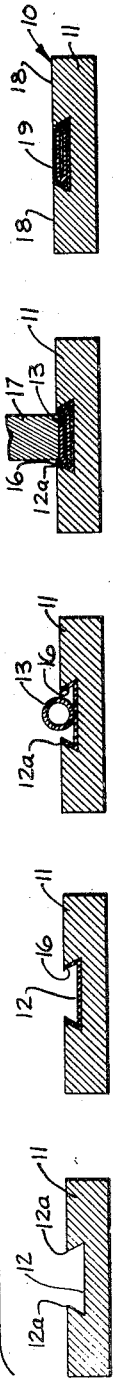
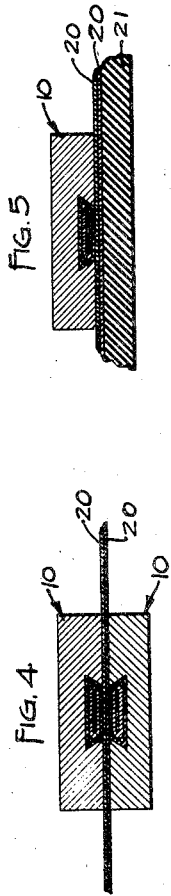
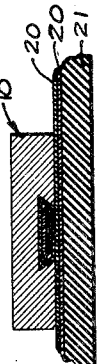
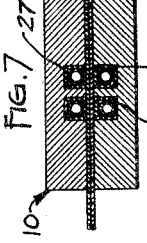
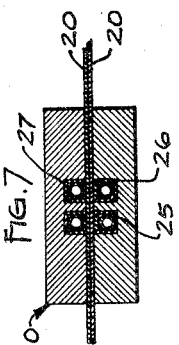
INVENTOR
THOMAS W. WINSTEAD
BY
Semmes, Keegin, Robinson and Semmes
ATTORNEYS Patented Sept. 13, 1949

2,481,554

UNITED STATES PATENT OFFICE 2,481,554

THERMOPLASTIC FILM HEAT SEALING ELEMENT

Thomas W. Winstead, Baltimore, Md.

Application December 17, 1946, Serial No. 716,800

15 Claims. (Cl. 201—64)

1

The present invention relates to bonding thermoplastic materials and has particular reference to improved apparatus for heat bonding thermoplastic films and sheeting and a method of forming the bonding apparatus.

The bonding of thermoplastic materials such as films and sheets has been accomplished by heat sealing methods in combination with the use of conventional plastic solvents for softening the surfaces of the thermoplastic materials prior to the application of heat. The use of solvents minimizes control of the permanence and strength of the film bond, as well as the area of the bond, due to the relatively unpredictable bonding action of the solvents upon application of heat to the thermoplastic film. The use of solvents extends the time required for a single bonding operation, and involves the use of additional apparatus. Application of excessive heat to the thermoplastic film must be avoided for it destroys the body of the film. From the standpoint of standardizing the product, the area and strength of the film bond may vary considerably, in spite of the most careful application of the heat sealing mechanisms.

A further disadvantage of present methods and apparatus for heat bonding thermoplastic film resides in the failure to provide for quick cooling of the bonding apparatus and adjacent thermoplastic surfaces, subsequent to each bonding operation. If a substantial portion of the bonding heat is accumulated in the bonding apparatus and the thermoplastic materials adjacent the bond, undesirable extrusion of the plastic material and distortion of the film surfaces occurs, under the pressure of the bonding apparatus. The bond of the composite thermoplastic article is weakened by uncontrolled thinning down of the film and the formation of bubbles adjacent the bond.

In the heat bonding of thermoplastic film, it is desirable that the bonding apparatus presents a flat heating surface of standard dimension against the film surfaces, in order to standardize the bond area and insure formation of a neat, strong bond. With present bonding apparatus, it is the practice to heat the pressure member itself in order to secure and maintain a sufficiently elevated temperature at the bonding point adjacent the thermoplastic film surface. This results in irregular extension of the area of the film bond, and presents difficulties of clean separation of the pressure face of the bonding apparatus and the heated plastic surfaces.

A disadvantage of thermoplastic film bonding

2 apparatus employing electrical resistance as the source of heat, resides in the fact that the heating element in the pressure member contracts and expands upon alternate heating and cooling, displacing itself from the securing means, necessitating frequent repair and replacement of the pressure member.

It is an object of the present invention to obviate the above-mentioned disadvantages by providing a simple and inexpensive apparatus for use in the heat bonding of thermoplastic film and sheeting.

A further object is to provide an apparatus for the heat bonding of thermoplastic film which is practically instantaneous in operation, producing a film bond of considerable strength and standard dimension, free from extrusion of plastic material adjacent the bond area and free from film weakness resulting from thinning down of portions of the thermoplastic film strips.

A further object of the invention is to provide a novel method of manufacture of an apparatus for use in the heat bonding of thermoplastic film.

A further object is to provide an apparatus for use in the heat bonding of thermoplastic film wherein the area of the heat zone is identical with the size of the film bond desired, the heat zone being characterized by practically instantaneous cooling subsequent to completion of each heat bonding operation.

Still a further object is to provide a novel heating mechanism for use with heat bonding apparatus for the sealing of the thermoplastic films which permits of a very rapid heating and cooling of the contacting surfaces and permits of formation of a perfectly flat heating surface for application against the thermoplastic film in the plane of the surface of the pressure member, retaining the heat softened plastic on the film surface in the area of the bond.

Other objects and advantages of the invention will be apparent from the following detailed description of the drawings wherein:

Figure 1 is a perspective view of the thermoplastic film bonding device of the present invention;

Figure 2 is a perspective view of a preferred form of electrical resistance element employed in forming the bonding device;

Figure 3 includes cross sectional views of the bonding device in the various stages of formation;

Figure 4 is a cross section view of two of the bonding devices in operative position adjacent opposite surfaces of thermoplastic film to be joined;

Figure 5 is a cross sectional view of a single bonding device employed to join two thermoplastic sheets;

Figure 6 is a perspective view of a further embodiment of bonding device of the invention; and Figure 7 is a cross sectional view of the embodiment shown in Figure 6, showing two of the bonding devices in operative position adjacent the surfaces of thermoplastic film.

Referring to the drawings, in Figure 1 there is shown the bonding device of the invention, comprising a member 10 which may be composed of a strip of metal 11, preferably characterized by extremely high heat conductivity in order to accelerate dissipation of heat. As is shown in Figures 1 and 3, the member 10 is substantially rectangular in shape and is grooved longitudinally to form a dovetailed slot 12 therein adapted to receive an electrical resistance element 13 which provides a source of heat. The resistance element 13 is provided with the usual leads 14 at either end for establishing connection with a suitable source of electricity, not shown.

In the preferred embodiment of the invention, the resistance element 13 comprises a coil formed from flat ribbon wire, as is shown at 15 in Figure 2. The wire coil 15 may be formed by helically winding the flat ribbon wire on a suitable mandrel, and is characterized by being expansible and contractible within its own length in response to changes in temperature during operation of the bonding device.

The progressive stages of formation of the bonding device are shown in Figure 3. The pressure member 10 is formed by lining the dovetailed groove 12 with a thin layer of suitable electrical insulating material 16. The insulating material may be porcelain or any other well-known electrical insulation, and is applied in such manner as to preserve the dovetailed formation of the groove 12.

The resistance element 13 is then placed in and along the length of the groove 12 and deformed therein as at 15a in Figure 2 with the application of pressure so that the resistance element spreads laterally to lock itself mechanically under the overhanging shoulders 12a of the groove 12. Deformation and placement of the resistance element 13 in the groove 12 may be accomplished by a suitable peening member or punch 17. The resistance element 13 is positioned as nearly adjacent the plane of the pressing surface 18 of the member 10 as is possible, in order to locate the source of heat at the face of the member 10. This is important in order to present the maximum heat generated in the resistance element 13 instantaneously at the point of bonding, minimizing accumulation of heat in the member 10 upon repeated operation to a point permitting of immediate dissipation of residual heat from the bonding device when the resistance element is deenergized.

When the resistance element 13 is mechanically locked in the dovetailed groove, the groove aperture in the pressing surface 18 of the member 10 is sealed off with insulating material as at 19 in Figure 3 to complete the assembly of the bonding member 10. The pressure surface 18 of the member 10 now is perfectly flat, in unbroken plane. This ensures against distortion of the film surfaces when the bond is formed.

When it is desired to bond thermoplastic film or sheets, the pressing member 10 is placed in a suitable pressure jig, not shown, and is positioned adjacent films 20 as shown in Figure 4. The electric leads 14 are connected with a suitable source of electricity, not shown. A current of electricity then is passed through the resistance element 13 of the bonding member 10 and the resulting heat is imparted instantaneously to the thermoplastic film adjacent the resistance element. When the electric current is turned off, residual heat present in the thermoplastic film as well as in the resistance element 13 immediately is absorbed and dissipated by the metal bonding member 10. To this end, the insulating layers 16 and 19 should be as thin as is consistent with their insulating function so that cooling of the surfaces is not inhibited thereby.

In carrying out the invention, two bonding members 10 may be placed in suitable jigs and positioned on opposite sides of the thermoplastic films to be bonded as shown in Figure 4, or the bond may be accomplished by the use of one bonding member 10, placing the thermoplastic films on a suitable support 21. In either case, operation of the bonding device is accomplished in the manner previously described.

In a further embodiment of the invention, the resistance element 13 may comprise a helical coil 22 wound from very fine round wire, as indicated in Figure 6. In this embodiment of this invention the pressing member 10 is grooved longitudinally at 23 and 24 to provide a plurality of parallel, adjacent grooves for one or more resistance elements 25 and 26. The parallel grooves preferably are located very close together, and are coated with a thin layer of suitable electric insulating material 27 as shown in Figure 6. The source of heat of the member 10 is provided by the two helically wound round coils, contrasting with the embodiment thereof previously described, and present the same dimensions insofar as the heat zone is concerned. By increasing the number of coils 25 and 26, the heat zone may be increased in size as desired. Extended portions 28 of the resistance elements 25 and 26 form leads for the purpose of establishing connections with a source of electricity.

To form the member 10, the resistance elements 25 and 26 are placed in the grooves 23 and 24, and are seated therein on a layer of electrical insulating material, which also serves to seal the elements 25 and 26 in the member 10. The seal provides a perfectly flat bonding surface, as is shown in Figure 7. In use, the bonding members 10 may be employed in the manner previously described.

An important feature of the present invention rests in the use of electrical resistance elements as the heat source, formed of helically coiled wire. This feature prevents cracking of the insulation and inhibits loosening of the resistance element from its position in the bonding member 10, through the normal expansion and contraction thereof resulting from repeated heating and cooling. The minute spaces between the helices of the coils permits of absorption of this characteristic movement, within the bulk of the helical coil.

In one embodiment of the invention, the resistance elements are locked mechanically in the bonding member, with the desirable result that the superimposed and adjacent layers of insulating material are relieved of stresses ordinarily attributable to securing the resistance elements in the bonding member. The heating area of the bonding member 10 is clearly defined, and concentrates heat for application to the thermoplastic film at the exact point of bonding. The working surface of the bonding member 10 is perfectly flat, obtaining a smooth, even bond. The source of heat is located as near the working surface of the member 10 as is possible, minimizing waste of heat and undue transfer of heat to the member 10 during a bonding operation.

It is apparent that the bonding member 10 may be formed in any shape or length desired. The helical coil resistance elements may be inserted in any shape groove desired for a particular bonding operation. The construction of the bonding member 10 is extremely simple, inexpensive to make, and permits of extremely rapid heating and cooling of the bonding and film surfaces, which is a critical consideration in securing a perfect bond of a thermoplastic material free from drawing or extrusion adjacent the area of the bond. The excess heat generated by the electrical resistances is absorbed and dissipated by the bonding member as quickly as the resistances create the necessary film bonding temperature. In practice, bonding of thermoplastic film has been effected easily with a total elapsed time of one second. This is also of importance from the standpoint of speed and economy in operation. As used in the foregoing specification and following claims, the term "flat" is used to describe the working surfaces of the bonding device as being smooth and even rather than in the sense that these surfaces are geometrically plane. Although the working face of the bonding device is shown in the drawings as plane over its whole area, this illustration is by way of example, and it is obvious that other surfaces than plane fall within the spirit of the invention so long as such surfaces are smooth and even, and the working face of the heating portion lies substantially flush with the adjacent portions of the pressure member.

While the invention has been described with reference to the specific embodiments disclosed in the drawings, obvious equivalents and substitutions may be made in carrying out the invention by one skilled in the art. Accordingly, it is to be limited only as set forth in the following claims.

I claim:

1. Apparatus for heat bonding thermoplastic film comprising a member having a grooved pressing surface, an electrical heating element in the groove, and electrical insulation on the groove and flush with said surface and seating the heating element in the groove adjacent the said surface of the member.

2. Apparatus for heat bonding thermoplastic film comprising a substantially rectangular metal pressure member characterized by high heat conductivity and having a grooved pressing surface, an electrical heating element in the groove, and a thin layer of electrical insulating material seating the heating element in the groove and sealing the groove flush with the pressing surface of the pressure member.

3. Apparatus for heat bonding thermoplastic film comprising a member having a grooved pressing surface, an electrical resistance element of helically wound flat wire ribbon in the groove and extending the length thereof, and electrical insulating material seating the coil in the groove and sealing the groove flush with the pressing surface of the member.

4. Apparatus for heat bonding thermoplastic film comprising a member having a grooved pressing surface, an electrical heating element formed of helically wound thin round wire in the groove and extending the length thereof, the said element being expansible and contractible within its length in response to changes in temperature, and electrical insulating material seating the element in the groove and sealing the groove flush with the pressing surface of the member.

5. Apparatus for heat bonding thermoplastic film comprising a pressure member having a pressing surface, said surface having a groove therein, an electrical resistance heating element mechanically secured in the groove, and electrical insulation insulating the said heating element from the pressure member and sealing the groove flush with the surface of the pressure member.

6. Apparatus for heat bonding thermoplastic film comprising a substantially rectangular metal pressure member having a pressing surface, said surface having a longitudinally extending groove therein, an electrical resistance heating element mechanically secured in the groove, and electrical insulation lining the groove, insulating the said heating element from the pressure member, and sealing off the groove in the plane of the pressing surface of the pressure member.

7. Apparatus for heat bonding thermoplastic film comprising a pressure member having a pressing surface, said surface having an inwardly dovetailed groove therein, an electrical resistance heating element mechanically secured in the dovetailed groove, and electrical insulation lining the groove and sealing off the groove in the plane of the pressing surface of the pressure member.

8. Apparatus for heat bonding thermoplastic film comprising a pressure member having a pressing surface, said surface having an inwardly dovetailed groove therein, an electrical resistance element formed of flat wire ribbon coiled in helix form in and extending the length of the groove, the said coil being deformed in the groove to fix the coil beneath the dovetailed edges of the groove adjacent the plane of the said pressing surface, and electrical insulation lining the groove and sealing off the groove flush with the pressing surface of the pressure member.

9. Apparatus for heat bonding thermoplastic film comprising a member having a pressure surface, said surface having a plurality of grooves therein, electrical resistance heating elements in the grooves, and electrical insulation lining each groove and sealing off each groove flush with the said surface of the member.

10. Apparatus for heat bonding thermoplastic film comprising a member having a pressure surface, said surface having a plurality of longitudinally extending grooves therein, an electrical resistance heating element in and extending the length of each groove, electrical insulation lining each groove and seating the said heating elements, and electrical insulation sealing off each groove flush with the pressure surface of the member.

11. Apparatus for heat bonding thermoplastic film comprising a member having a pressure surface, said surface having a plurality of longitudinally extending parallel grooves therein, an electrical resistance heating element formed of thin round wire coiled in helix form in and extending the length of each groove, the said coils being expansible and contractible in response to changes in temperature, electrical insulation lining each groove and seating the said heating elements, and electrical insulation sealing off each groove flush with the pressure surface of the member.

12. A method of forming a mechanism for heat bonding thermoplastic film comprising forming a groove in a continuous surface of a base member, coating the groove with an electrical insulating material, inserting an electrical heating coil in the insulated groove, deforming the coil in the groove to mechanically fix the coil in the base member, and sealing off the groove to reform the continuous surface of the base member.

13. A method of forming a mechanism for heat bonding thermoplastic film comprising forming a groove in a continuous surface of a base member, coating the inner surface of the groove with a thin layer of an electrical insulating material, inserting a helically wound electrical resistance coil in the insulated groove, deforming the coil in the groove to mechanically fix the coil in the base member, and sealing off the groove to restore the continuous surface of the base member.

14. A method of forming a mechanism for heat bonding thermoplastic film comprising forming an inwardly dovetailed groove in a continuous surface of a base member, coating the surface of the groove with a thin layer of an electrical insulating material, inserting a helically wound electrical resistance coil in and along the length of the groove, pressing the coil into the groove to deform the coil into the space defined by the overhanging shoulders of the dovetailed groove, thus permanently mechanically fixing the coil in the groove, and sealing off the groove with an electrical insulating material to restore the continuous surface of the base member.

15. Apparatus for heat bonding thermoplastic film comprising a pressure member characterized by high heat conductivity and having a flat pressure surface, heating means carried by said member and having a flat working face identical in contour to the desired bond and substantially flush with said pressure surface, said heating means including an electrical resistance element, the said pressure surface adjoining opposite edges of said working face and extending substantially beyond said edges.

THOMAS W. WINSTEAD.

REFERENCES CITED

The following references are of record in the file of this patent:

UNITED STATES PATENTS

| Number | Name | Date |
| --- | --- | --- |
| 971,101 | Van Aller | Sept. 27, 1910 |
| 1,645,867 | Louthan | Oct. 18, 1927 |
| 2,217,465 | Barnsteiner et al. | Oct. 8, 1940 |

FOREIGN PATENTS

| Number | Country | Date |
| --- | --- | --- |
| 499,341 | Great Britain | Jan. 23, 1939 |